United States Patent
Sargent

(10) Patent No.: US 12,483,648 B1
(45) Date of Patent: Nov. 25, 2025

(54) DEFENSE RECORDER SYSTEM AND PROCESS

(71) Applicant: Nicholas David Sargent, Aurora, CO (US)

(72) Inventor: Nicholas David Sargent, Aurora, CO (US)

(*) Notice: Subject to any disclaimer, the term of this patent is extended or adjusted under 35 U.S.C. 154(b) by 358 days.

(21) Appl. No.: 18/219,928

(22) Filed: Jul. 10, 2023

Related U.S. Application Data

(60) Provisional application No. 63/415,183, filed on Oct. 11, 2022.

(51) Int. Cl.
*H04M 1/72424* (2021.01)
*G11B 20/10* (2006.01)
*H04W 4/029* (2018.01)

(52) U.S. Cl.
CPC ... *H04M 1/72424* (2021.01); *G11B 20/10527* (2013.01); *H04W 4/029* (2018.02); *G11B 2020/10546* (2013.01)

(58) Field of Classification Search
CPC ......... H04M 1/72424; G11B 20/10527; G11B 20/10546; H04W 4/029
See application file for complete search history.

(56) References Cited

U.S. PATENT DOCUMENTS

| | | | |
|---|---|---|---|
| 2016/0049017 A1* | 2/2016 | Busse | G07C 5/008 701/33.3 |
| 2021/0235357 A1* | 7/2021 | Lagassey | G08G 1/205 |

FOREIGN PATENT DOCUMENTS

| | | | | |
|---|---|---|---|---|
| EP | 2309665 A2 * | 4/2011 | | H04H 60/27 |
| JP | 2006333038 A * | 12/2006 | | |

* cited by examiner

*Primary Examiner* — Farid Seyedvosoghi
(74) *Attorney, Agent, or Firm* — Plager Schack LLP; Mark H. Plager; Stephen Hallberg

(57) ABSTRACT

A defense recorder system and mobile application-implemented process are disclosed. The defense recorder system and mobile application-implemented process combines GPS location to record in public areas when local laws state that audio recording is only legal in public areas. Single party consent states will not require the GPS function but will require the constant audio recording to be made in a loop, deleting the oldest of files automatically.

11 Claims, 5 Drawing Sheets

DEFENSE RECORDER SYSTEM AND PROCESS

CLAIM OF BENEFIT TO PRIOR APPLICATION

This application claims benefit to U.S. Provisional Patent Application 63/415,183, entitled "DEFENSE RECORDER SYSTEM AND PROCESS," filed Oct. 11, 2022. The U.S. Provisional Patent Application 63/415,183 is incorporated herein by reference.

BACKGROUND

Embodiments of the invention described in this specification relate generally to security surveillance cameras and general surveillance devices, and more particularly, to a defense recorder system and software-implemented defense recorder processes.

People are sometimes put into situations in which they must physically defend themselves against physical harm, defend their character against false accusations, or otherwise stand up for themselves in the face or any other harm or abuse by others (hereinafter generally referred to as a "conflict" situation).

Yet, these conflict scenarios and others often open the door to possible legal peril for a person defending themselves (or simply "defender") in a conflict because proving that the defender is justified in physically defending themselves in the conflict, proving that their character was slandered, or proving their innocence in any of several of conflict scenarios typically requires at least a corroborating witness or evidence, such as a corroborating video and/or audio recording. Having such evidence would be useful for the defender's own legal interests and even reputation.

While a willing and able witness can make a world of difference for any justified defender, witnesses are never a guarantee to be present during a conflict and many witnesses who are present during a conflict are reluctant to stand as a defense witness. For recordings (video and/or audio), there are many surveillance cameras and devices in the market. However, existing security surveillance cameras and general surveillance devices in the market neither adequately capture audio of an event nor follow a person's actions and/or audio recordings of events.

Another option is for a person to just carry a hand-held, portable recording device and start recording continuously whenever they feel the need and wherever they may happen to be. For a person who generally feels safe and secure, carrying (or even owning) such a recording device would be unlikely. Consequently, people may not have a dedicated recording device at the moment the conflict arises. But even for people who may carry such device, eventually the device itself would run out of storage space, forcing the user to manually delete or move audio recordings to another storage location off the device.

There are some existing systems and/or mobile apps that use video or audio recorders to constantly record video and/or audio, and many people carry cell phones, smartphones, etc. However, there are a number of issues that may limit a defender in gathering the evidence from a recording via existing systems and mobile apps. For instance, existing police badge cameras are so costly due to the cloud storage requirements, and these videos are stored for over a month before being removed from the system. Another existing option is to utilize mobile apps with mobile devices. However, there is limited recording ability of most apps and mobile devices due to limited onboard storage and limited file sizes. Also, management of saved recordings is entirely a manual process for the user, requiring the user to manually stop and start recordings and to manually identify and delete the useless ones. Another problem is that even when a recording is made (despite the above constraints), there is no effective way to automatically deliver the recording to another party, such as a designated contact who may help the investigation process. Another problem with just using onboard audio recording and existing recording apps is that the legality of recording other people depends on recording consent laws of the jurisdiction at which the defender is located.

By in large, recording outdoors in public is generally allowed everywhere, with only few exceptions, such as public land that is restricted by military, national security, government secrecy classifications, etc. However, laws and rules for recording indoors vary across different jurisdictions. For instance, some jurisdictions have local laws which forbid audio recording upon entering indoor locations while other jurisdictions have laws that allow for unrestricted audio recording to continue when entering indoor locations. Some other jurisdictions have "single party consent" laws which allow recording of audio when at least one party of the recording knows the recording is happening (usually, the person recording knows of the ongoing audio recording). However, even single party consent states have legal nuances which the user must understand in order to comply with the law. For instance, many single party consent law states require form of recording known as looping, which requires constant audio recording to be made in a loop, with the additional operations of deleting the oldest of files automatically, just like a car dash camera.

Yet, with different laws and rules for the many different jurisdictions in which one might wish to record audio, there is a lot of confusion about how to comply with the law. Specifically, a person who wishes to record audio must determine the local rules to ensure compliance with the law. Nevertheless, some users who wish to make audio recordings are ignorant or negligent of determining their rights and/or limitations by law, while others diligently check the local rules wherever they are recording, yet even this is prone to interpretation errors, misreading of the laws/rules, and other confusion. Consequently, most users are left with only limited understanding of the laws, or completely in the dark.

Therefore, what is needed is a way to eliminate the need for a user to start a recording during a conflict by automatically identifying a user's location and checking local rules for audio recording based on the user's location in order to continue or stop recording in abidance with the law, or to comply with single party consent laws in which constant recording must comply with looping rules to delete older recorded content while continuing to record the audio content during the conflict.

BRIEF DESCRIPTION

A novel defense recorder system and defense recorder processes are disclosed. In some embodiments, the defense recorder system is configured to assist a person (a "user") in gathering audio recordings at any location in a manner that automatically complies with local recording laws and overcomes conventional audio recording limitations. In some embodiments, the defense recorder system is further configured to assist the user in gathering personal defense information related to the audio recordings (also referred to as "related personal defense data"). The audio recordings and the related personal defense data can be used to help demonstrate and preserve the user's innocence in the eyes of the law if accused or accusing one of misconduct. In some embodiments, the defense recorder processes comprise a high-level defense recorder process and a detailed defense recorder process. In some embodiments, the high-level defense recorder process and the detailed defense recorder process are implemented as mobile applications ("high-level defense recorder mobile app" and "detailed defense recorder mobile app", respectively, but also referred to interchangeably as the "defense recorder mobile app").

In some embodiments, the defense recorder system provides automatic and continuously looping recording of audio and automatic management of recordings stored in a local storage of a mobile device. In some embodiments, the defense recorder system automatically ensures that a user complies with local recording laws of a jurisdiction at which the user is currently located.

In some embodiments, the defense recorder system comprises an isolated mobile device defense recorder system comprising the defense recorder mobile app that is installed and runs on a mobile device of a user, a jurisdictional recording laws database, an audio recordings database, a local storage of the mobile device, and a communications module of the mobile device. In some embodiments, the communications module comprises a cellular communications transceiver, a WiFi module, and a global positioning system ("GPS") module. In some embodiments, the location of the mobile device is determined based on location data received by the communications module.

In some embodiments, the defense recorder system automatically collects metadata associated with the audio recordings. In some embodiments, the metadata comprises location data, time data, body measurement and vitals data, acceleration data, etc.

In some embodiments, the defense recorder system provides other features including a cloud upload feature, a designated contact feature, and an afterlife feature.

In some embodiments, the defense recorder system provides a multi-mic configuration which allows the user to connect one or more external microphones (via wired or wireless connection to the user's mobile device). When one or more external microphones are connected to the mobile device, the external microphones are configured to capture live audio along with an onboard microphone of the mobile device. In some embodiments, the defense recorder mobile app utilizes an audio mesh system that is configured to seamlessly connect and align (time-wise) separate incoming audio streams in the audio recording and normalize a sound level of the connected and aligned audio streams in the audio recording.

In some embodiments, the defense recorder system comprises a cloud-based defense recorder system comprising a defense recorder cloud server, an audio recordings cloud database, and a jurisdictional recording laws cloud database. In some embodiments, the cloud-based defense recorder system hosts a cloud application service that provides access to the cloud-based jurisdictional recording laws database and the audio recordings cloud database. In some embodiments, the audio recordings cloud database is configured to securely store audio clips captured by devices of users of the defense recorder system. In some embodiments, the audio clips are encrypted for secure storage in the audio recordings cloud database and further secured by user permissions which limit access only to corresponding users who recorded the audio clips prior to storage in the audio recordings cloud database. In some embodiments, the cloud-based defense recorder system further comprises a front-end web server that provides (i) a web gateway to which browser programs on conventional computing devices connect to access the cloud application service and (ii) a mobile gateway to which the defense recorder mobile app connects, when running on a mobile device, to access the cloud application service. In some embodiments, the cloud-based defense recorder system further comprises a registered user database that is communicably connected to the front-end web server and provides user authentication services in connection with the web gateway and the mobile gateway. In some embodiments, the cloud-based defense recorder system further comprises a firewall and an administrator computing device configured to enable an administrator to make changes to the defense recorder cloud server, the audio recordings cloud database, and the jurisdictional recording laws cloud database as needed.

In some embodiments, the defense recorder system supports a cloud upload feature that configures the defense recorder mobile app to store audio recordings locally in the audio recordings database on the local storage of the mobile device of the user until the mobile device is connected to the internet. Once connected to the internet, the defense recorder mobile app automatically uploads the locally stored audio recordings to a cloud storage comprising one of the audio recordings cloud database and a third party cloud storage based on settings in an online cloud storage profile associated with the user. After uploading the audio recordings to the cloud storage (as configured in the settings of the user's online cloud storage profile), the defense recorder mobile app automatically deletes the locally stored audio recordings from the audio recordings database on the local storage of the mobile device. In this way, the defense recorder system is able to switch between operation as the isolated mobile device defense recorder system and operation as the cloud-based defense recorder system, depending on the availability of a network connection to the internet.

In some embodiments, the defense recorder system (whether operating as the isolated mobile device defense recorder system or the cloud-based defense recorder system) supports a multi-mic mode that enables a user to configure the defense recorder mobile app to receive audio captured simultaneously from multiple microphones. In some embodiments, the multi-mic mode triggers the defense recorder system to identify, continuously and in realtime, which microphone is capturing the highest quality audio. In some embodiments, the multi-mic mode also triggers the defense recorder system to apply the incoming audio from the identified microphone to the audio recording and switch, in realtime, to a different microphone when the defense recorder system detects that the audio quality captured by the different microphone is presently the highest quality audio among the multiple microphones. In some embodiments, a single audio recording from multiple microphones is supported by an audio mesh system that is configured to seamlessly connect and align (time-wise) separate incoming audio streams in the audio recording and normalize a sound level of the connected and aligned audio streams in the audio recording.

In some embodiments, the high-level defense recorder process comprises (i) receiving a command to start recording, (ii) determining a current location of a user, (iii) determining whether the current location is within a single party consent law state, (iv) automatically recording audio when the current location of the user is within a single party consent law state, (v) utilizing the current location to identify and reflect recording laws of the jurisdiction when the current location of the user is not within a single party consent law state, (vi) determining whether the user is in public, (vii) automatically recording audio when the user is in public, (viii) automatically stopping the audio recording when the user is not in public, (ix) alerting the user of the stopped audio recording, and (ix) automatically resuming audio recording when the user is back in public. In some embodiments, the high-level defense recorder process further comprises (x) saving the audio recording at a limit point comprising one of a time limit and an individual audio recording file size limit, (xi) seamlessly and immediately starting a new audio recording, (xii) repeating the steps for saving and seamlessly starting new audio recordings in a loop, and (xiii) deleting older audio recordings based on age (oldest audio recording file deleted) when available storage space reaches a threshold limit or when the number of saved audio recordings exceeds a threshold number of audio recordings.

In some embodiments, the detailed defense recorder process comprises (i) determining whether the user has engaged audio recording, (ii) identifying a present location of the user including a state in which the user is located currently and retrieving the recording consent laws for the state, (iii) recording audio until a stop recording command is triggered by the user selecting to stop audio recording or upon the user entering a private property location when the identified location of the user is in a state that does not observe single-party recording consent, (iv) alerting the user that recording has automatically paused (stopped momentarily) due to user's location upon entering the private property and will remain paused until the user leaves the private property, (v) alerting the user that audio recording has resumed when the user exits the private property, (vi) continuing to record the audio for a certain amount of time as directed by the user, (vii) ending the recording after the certain amount of time lapses, (viii) saving the audio recording and simultaneously starting a new audio recording automatically by the defense recorder mobile app, (ix) determining whether a number of saved audio recordings exceeds a threshold number of audio recordings configured to store in total (as directed by the user), and (x) deleting the oldest audio recording to make space for the newest audio recording when the number of saved audio recordings exceeds the threshold number of audio recordings.

The preceding Summary is intended to serve as a brief introduction to some embodiments of the invention. It is not meant to be an introduction or overview of all inventive subject matter disclosed in this specification. The Detailed Description that follows and the Drawings that are referred to in the Detailed Description will further describe the embodiments described in the Summary as well as other embodiments. Accordingly, to understand all the embodiments described by this document, a full review of the Summary, Detailed Description, and Drawings is needed. Moreover, the claimed subject matters are not to be limited by the illustrative details in the Summary, Detailed Description, and Drawings, but rather are to be defined by the appended claims, because the claimed subject matter can be embodied in other specific forms without departing from the spirit of the subject matter.

BRIEF DESCRIPTION OF THE DRAWINGS

Having thus described the invention in general terms, reference is now made to the accompanying drawings, which are not necessarily drawn to scale, and which show different views of different example embodiments.

Figure 1:
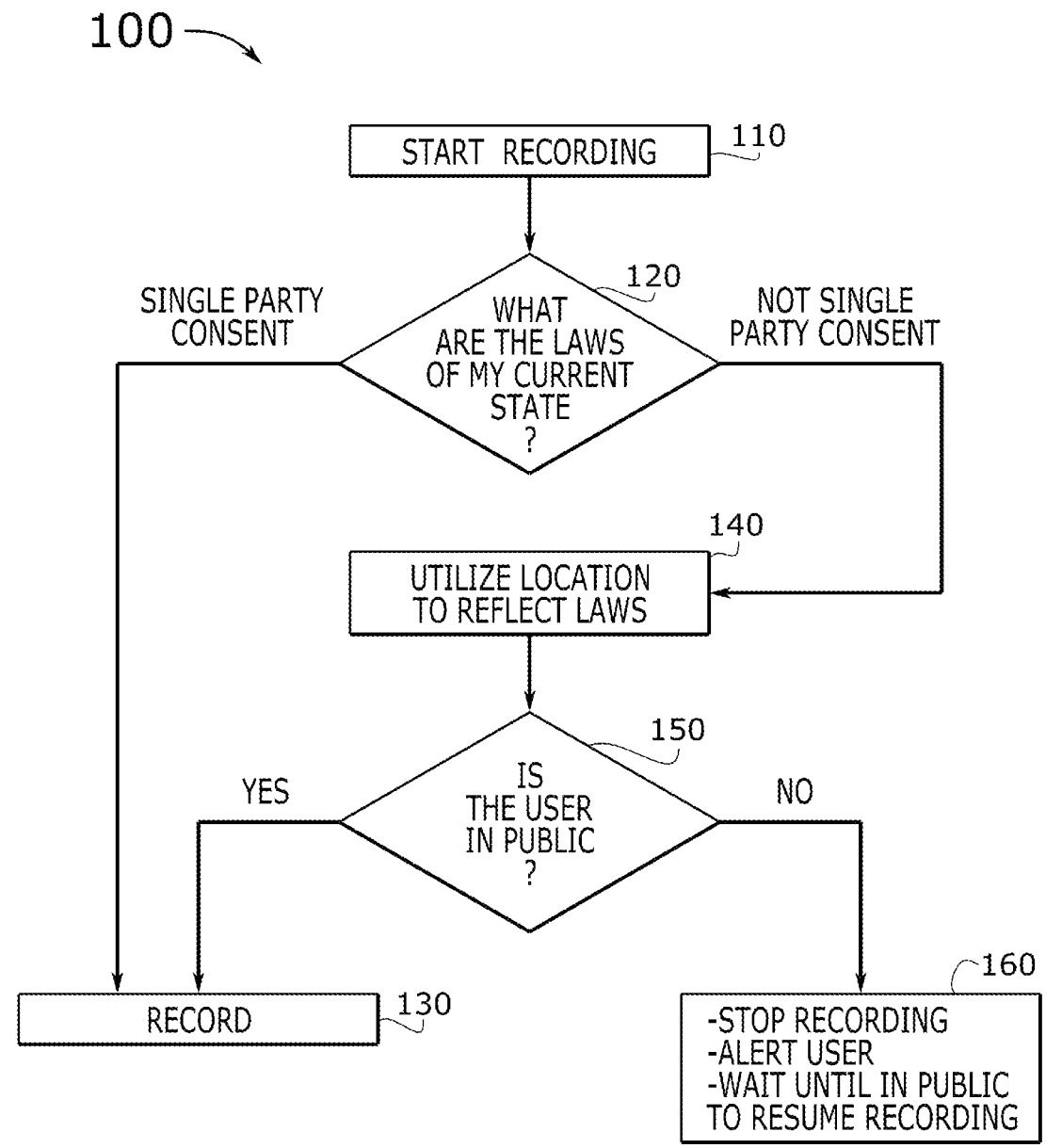

FIG. 1 conceptually illustrates a high-level defense recorder process in some embodiments.

Figure 2:
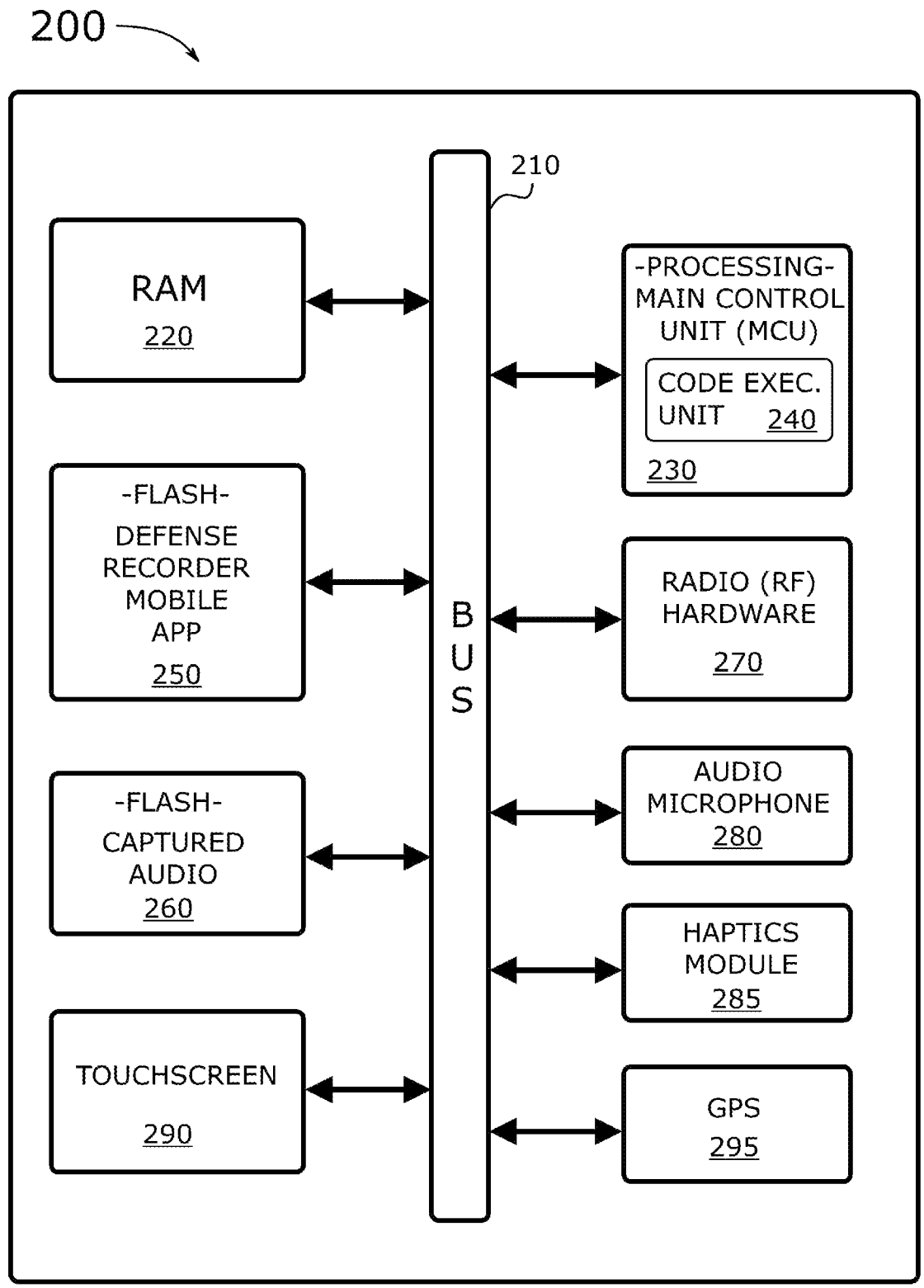

FIG. 2 conceptually illustrates a block diagram of an electronic mobile device that supports the isolated mobile device defense recorder system.

Figure 3:
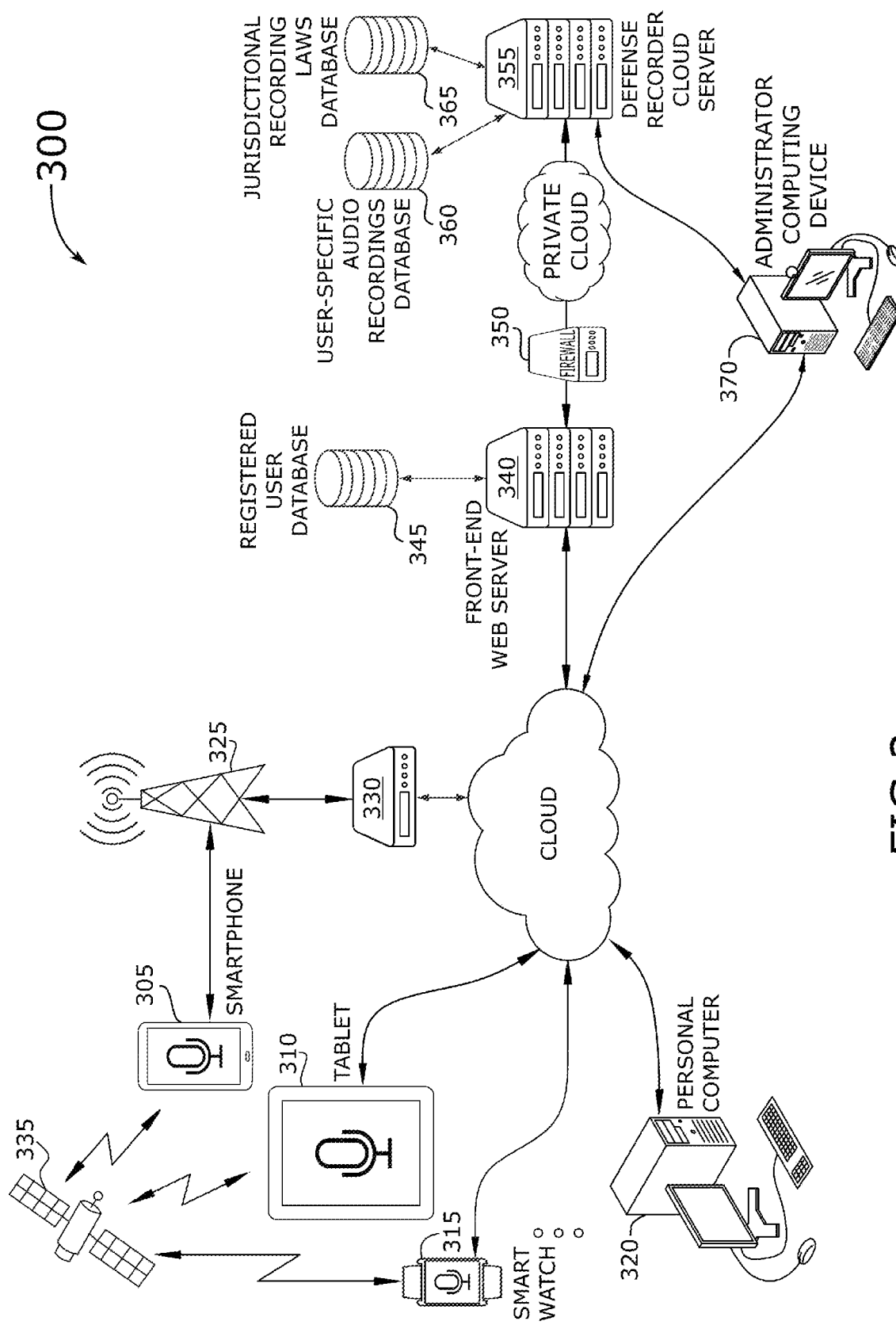

FIG. 3 conceptually illustrates a network architecture of a cloud-based defense recorder system in some embodiments that hosts a defense recorder cloud application service.

Figure 4:
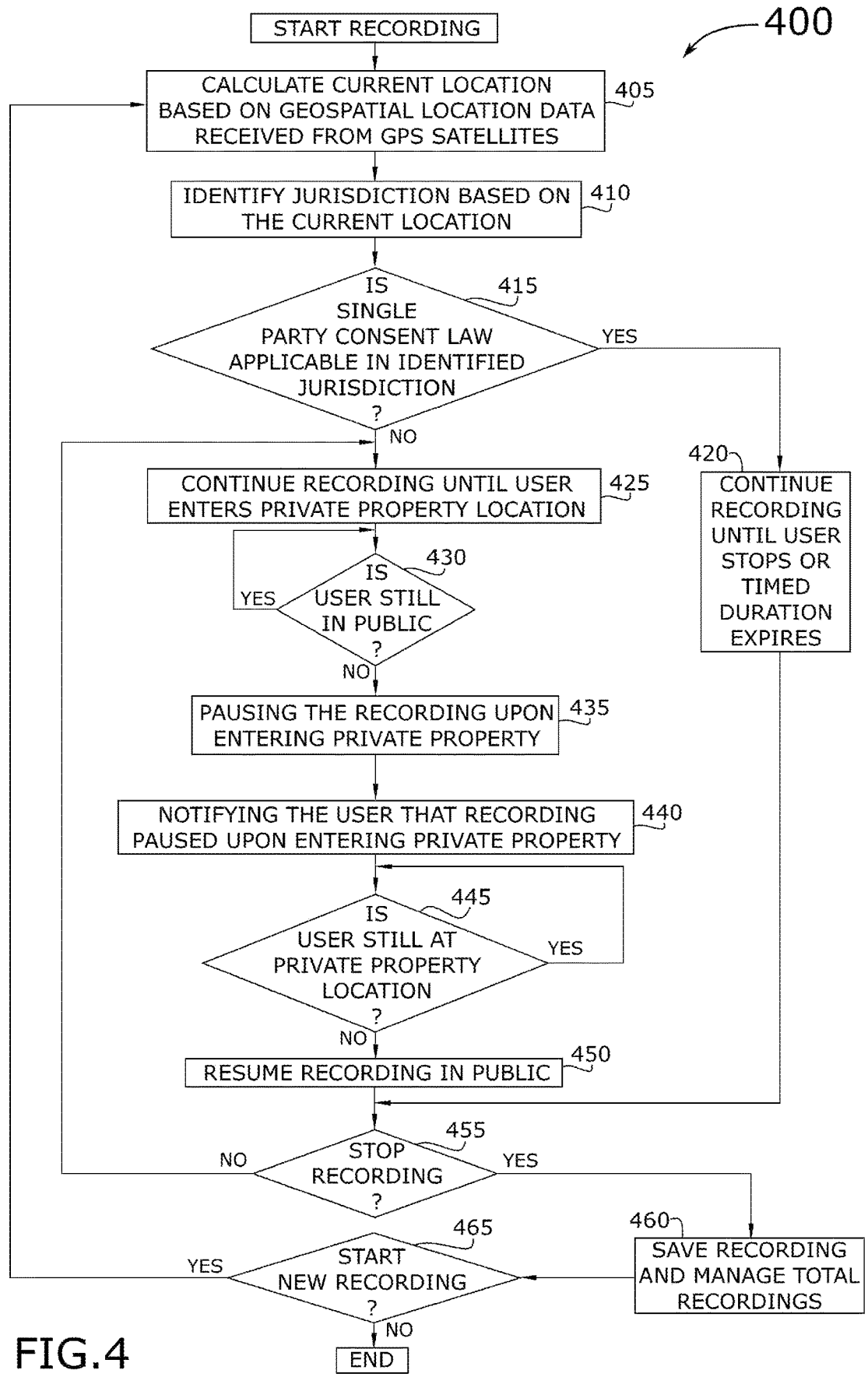

FIG. 4 conceptually illustrates a detailed defense recorder process in some embodiments.

Figure 5:
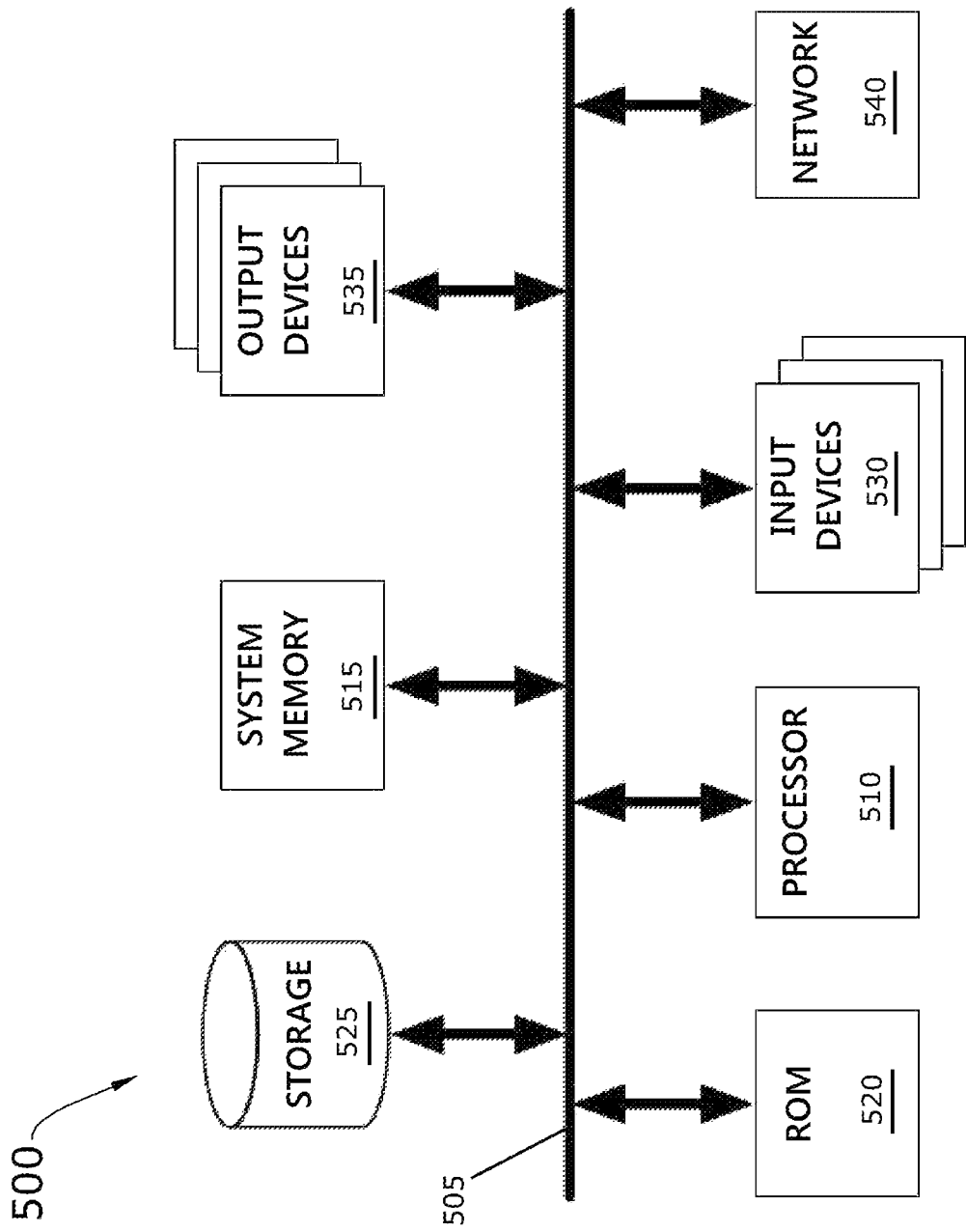

FIG. 5 conceptually illustrates an electronic system for a non-mobile computing device (such as a cloud server) that is configured to receive audio recordings provided by electronic mobile devices of registered users and store the audio recordings in an audio recordings cloud database and with which other aspects of the invention are implemented.

DETAILED DESCRIPTION

In the following detailed description of the invention, numerous details, examples, and embodiments of the invention are described. However, it will be clear and apparent to one skilled in the art that the invention is not limited to the embodiments set forth and that the invention can be adapted for any of several applications.

Some embodiments include a novel defense recorder system and software-implemented defense recorder processes which assist a user in gathering audio recordings at any location in a manner that automatically complies with local recording laws and overcomes conventional audio recording limitations. In some embodiments, the defense recorder system is further configured to assist the user in gathering related personal defense data. By capturing and storing the audio recordings and the related personal defense data, the user is able to provide evidence that helps to demonstrate and preserve their legal innocence if accused or accusing one of misconduct.

In some embodiments, the defense recorder system provides automatic and continuously looping recording of audio and automatic management of recordings stored in a local storage of a mobile device. In some embodiments, the defense recorder system automatically ensures that a user complies with local recording laws of a jurisdiction at which the user is currently located.

In some embodiments, the defense recorder system automatically collects metadata associated with the audio recordings. In some embodiments, the metadata comprises location data, time data, body measurement and vitals data, acceleration data, etc.

In some embodiments, the defense recorder system provides other features including a cloud upload feature, a designated contact feature, and an afterlife feature.

In some embodiments, the defense recorder system provides a multi-mic configuration which allows the user to connect one or more external microphones (via wired or wireless connection to the user's mobile device). When one or more external microphones are connected to the mobile device, the external microphones are configured to capture live audio along with an onboard microphone of the mobile device. In some embodiments, the defense recorder mobile app utilizes an audio mesh system that is configured to seamlessly connect and align (time-wise) separate incoming audio streams in the audio recording and normalize a sound level of the connected and aligned audio streams in the audio recording.

In some embodiments, the defense recorder system operates in an isolated mode that is configured to work in the absence of a network connection (referred to as the "isolated mobile device defense recorder system"). The isolated mobile device defense recorder system is described below, by reference to FIG. 2. In some embodiments, the defense recorder system comprises a cloud-based defense recorder system that is configured to operate in a cloud-connected mode when connected to a cloud application service over a network. The cloud-based defense recorder system is described further below, by reference to FIG. 3.

In some embodiments, the defense recorder processes comprise a high-level defense recorder process and a detailed defense recorder process. In some embodiments, the high-level defense recorder process and the detailed defense recorder process are implemented as the defense recorder mobile app. The high-level defense recorder process is described below, by reference to FIG. 1, while the detailed defense recorder process is described further below, by reference to FIG. 4.

Embodiments of the defense recorder system and processes described in this specification solve many of the problems with existing recording systems and applications by providing a universal way (software-implemented defense recorder mobile app that runs on a mobile device) to record audio in a looping manner that is completely automated and seamlessly ensures that recording continues when limits are reached (e.g., file size limits, number of saved audio recordings, timed recordings, etc.), and which ensures that the user is not violating audio recording laws wherever the user may be located at any given time, yet ensuring that the user can access the audio recordings at a later time to restore reputation and/or provide evidence for a legal defense, etc.

Embodiments of the defense recorder system and the defense recorder mobile app-implemented processes described in this specification differ from and improve upon currently existing options. In particular, some embodiments differ from existing options which typically do not utilize GPS to determine location in order to comply with local audio recording laws, nor do they identify a jurisdiction's particular rules/laws for public and private recording. By contrast, the defense recorder system and the defense recorder mobile app-implemented processes are configured to comply with the laws for recording wherever the user may be located. Specifically, the defense recorder mobile app combines the operations for obtaining user's GPS location with operations for determining the recording laws/rules at user's location to record in public areas when local laws only permit audio recording in public areas, with understanding of single party consent state rules which obviate the need for GPS but require some understanding the requirements (if any) for constant audio recording, whether allowed without restriction or requiring recordings to be made in a loop, deleting the oldest of files automatically. Furthermore, the defense recorder mobile app automatically stops and resumes recording as needed to comply with the laws for audio recordings, thereby allowing the user to legally collect audio recordings without a specific knowledge of the local recording laws. This gives the user peace of mind knowing that the recording is being made in compliance with the audio recording laws and that the resulting audio recordings may be used in court to justify the users actions.

The defense recorder system and the defense recorder mobile app-implemented processes may be comprised of the following elements and steps.
1. GPS location obtained by GPS receiver embedded in mobile device
2. Data sources from which to retrieve local state laws to use in determining local laws by the defense recorder mobile application running on the mobile device
3. Audio recording microphone(s) of the mobile device to record audio of any length, limited by the local laws and at the discretion of the user
4. Audio recordings storage, which can be a storage device of the mobile device capturing the audio or cloud data storage to which audio recordings are streamed for storage (the audio recordings storage being configured to store any number of audio recordings)

The defense recorder system and the defense recorder mobile app-implemented processes of the present disclosure may record audio via the mobile device's onboard or externally connected microphone(s) (including multiple microphones when the multi-mic configuration is set), such that the recording is continuous as allowed by law, with each recording lasting a certain amount of time as determined by the user. Then a number of these audio recordings will be saved to the storage. The number of recordings may be predetermined in the defense recorder mobile app or set by the user. The defense recorder mobile app will automatically delete the oldest of the recordings when the predetermined limit is reached. However, there are options for cloud storage upload which, if configured by the user, would automatically upload audio recordings set to be deleted to a cloud storage before actual deletion of the audio recording on the mobile device of the user occurs. Also, in a cloud-based defense recorder system, cloud storage upload may be a default setting to ensure that all recordings are stored at a location accessible to the user in the future even in the event that their own device becomes inaccessible (e.g., taken from them, destroyed, hacked, etc.). In some embodiments, the user manually saves recordings before they are automatically deleted in order to keep and use the recordings. For instance, after a new recording is completed (or after several new recordings are completed), the defense recorder mobile app may provide an option to save or discard the recording (or save/discard each of the several new recordings, by selection, such as checkbox or other). However, the defense recorder mobile app may continue to operate automatically in the manner described above (with automatic deletion of the oldest recordings and cloud upload feature) since the user will not always be in a position to manually specify whether and which audio recordings to delete or save.

In some embodiments, the defense recorder mobile app gets the user's location by GPS in order to comply with the local state laws for each specific user. In some embodiments, this results in automatically pausing audio recording when the user enters a private location, and then (later), automatically resuming the recording once the user leaves the private location, all while alerting the user of the automatically triggered changes to the recording.

The defense recorder system and mobile application-implemented process of the present disclosure generally works by determining the legal requirements and restrictions for audio recording and using GPS to ascertain the user's location at all times in order to legally collect audio recording(s) by way of the onboard or connected microphone(s) of the user's mobile device. Furthermore, when the user's location is within a state that does not recognize single-party-consent laws, the defense recorder system only records audio when the user is in a public space, automatically stopping audio recording when the user's location transitions into private locations. In this way, the defense recorder system and mobile application-implemented process of the present disclosure enables a user to gather legal evidence to utilize in legal proceedings or otherwise, such as to justify legal self-defense, use of force, or other scenarios in which the user may face legal challenges.

In some embodiments, a person uses the defense recorder mobile app by way of a user interface to interact with the mobile app on a mobile device. The user interface of the defense recorder mobile app includes a sign-up screen. Upon the first time opening the app, users will be required to create an account, this account information will be stored into a database and a mailing list, the account fields will consist of the following: full name, email, phone number, city. In some embodiments, the defense recorder mobile app applies in general terms to usage, such as providing the app as a monthly subscription app where the mobile app does not do anything unless an active subscription is in place. Also, generally, the defense recorder mobile app is configured to constantly record audio from the microphone of the user's device. The user can set parameters to decide how long to record each audio clip and how many recordings are saved before the oldest recordings are deleted. When the user does not want certain audio clips to be automatically purged, the user will have the option to override this by manually saving the recording before it is automatically deleted.

In some embodiments, the defense recorder mobile app automatically logs a number of parameters for GPS, audio/microphone recording, Bluetooth device(s), and smart wearables, such as a watch, if paired. In particular, the GPS will log parameters for the user's speed, elevation, trip distance along with tracing a line of the user's path on a map. The GPS location will also be important if the user is in a state which does not recognize single party consent, which is described further below. For audio/microphone recording, the defense recorder mobile app constantly records audio from the microphone. For Bluetooth device(s), data is logged for when the user was listening to music and when the user was in his personal vehicle and connected to the car's Bluetooth receiver. A car play connection also acts as a trigger to always record while in the car.

In some embodiments, the defense recorder mobile app is configured to manage clips. Clips refers to a file that is presently and continuously recording and saving data. In some embodiments, the user can decide how long the defense recorder mobile app will record clips before being stored as a file. In some embodiments, the defense recorder mobile app is also configured to manage files. In some embodiments, files are the same as clips, with an exception that files are not presently being recorded. The user can decide how many files are stored on the device before the mobile app automatically deletes the oldest file to make room for the newest file. In some embodiments, the defense recorder mobile app is configured to manage file playback with the aforementioned parameter settings, as configured by the user. Playback is possible when the GPS location and the audio recording match in timing—that is, the time at which the GPS location is determined and the time of recording the audio match. Thus, the user location, the time, and the audio recording match upon playback.

In some embodiments, the defense recorder mobile app is configured with several recording triggers. In some embodiments, the recording triggers are configured to automatically start, stop or pause recording of the audio upon detection of any particular event. For instance, the user pressing the "stop recording" user interface button will trigger the mobile app to stop recording. Also, the only exception to truly continuous recording, is when the user is in a state that does not recognize single party consent, in which case, once the user enters a private property, the recording will automatically pause and alert the user, but even then, the user will be able to manually overwrite this trigger (on a per event basis, this GPS auto pause feature cannot be turned off when the user is in one of the states which don't recognize single party consent).

Other recording triggers comprise (i) a trigger for manual start of recording whereby the user selects a "start recording" button in the user interface of the mobile app, (ii) a custom button for the user to trigger a function of the mobile app by depressing a physical button of the mobile device, thereby making the option available to the user, (iii) a trigger when the mobile app detects a wireless car connection is established via Bluetooth and the user is driving the car, in which case the mobile app records audio continuously as normally happens (if this feature is enabled in the user settings of the mobile app), (iv) several GPS triggers including GPS detecting the user entering a private property and the GPS detecting the user leaving the private property, (v) several auto-record triggers including (a) any incoming or outgoing call to a specific phone number (in which the user has made a list of one or more phone numbers that immediately trigger recording when calling to the user or the user calling out to the other person at the end of the listed number), (b) a microphone volume threshold trigger whereby the user can select a certain volume which once detected by the microphone, will trigger auto record, and (c) a Siri trigger that can be triggered with the device's OS voice assistant, and (vi) a manual stop recording entry in which the user presses/selects the "stop recording" button in the user interface of the mobile app. Note that for the GPS triggers, the user's GPS location will decide whether or not the GPS triggers are necessary, depending on the state of the user, the app may need to automatically pause recording when the user enters a private property. In this event, the user will be notified that recording has paused. The user can manually overwrite this by manually pressing a button called "resume recording". Also, once the user leaves a private property, the mobile app will automatically resume the paused recording and alert the user that recording has resumed. Additionally, for the auto-record triggers, once triggered, the mobile app records like normal, overwriting anything that may have paused the recording (beside manual pause). Saving all new files, and flagging a predetermined (by the user) number of recently recorded files. This constant-record and immediate-save function will go on until the user manually resets this trigger.

In some embodiments, the defense recorder mobile app is configured with file options (excluding auto-delete). The file options include (i) a manual save option in which the user can go back through stored files and select to save a file, which will keep the file from being deleted, once saved, the file can then only be deleted manually by the user, (ii) a share option by which the file is able to be shared over text (SMS), email, and other conventional sharing options that a user is given when sharing content of various sorts (e.g., sharing a picture), and (iii) an auto-share option which automatically shares a predetermined number of files, when triggered, to a list of emergency contacts that was personally provided (input) by the user. Also, the auto-share option can be configured to work with Siri so that it can be triggered to work with the mobile device's OS voice assistant.

In some embodiments, the high-level defense recorder process comprises (i) receiving a command to start recording, (ii) determining a current location of a user, (iii) determining whether the current location is within a single party consent law state, (iv) automatically recording audio when the current location of the user is within a single party consent law state, (v) utilizing the current location to identify and reflect recording laws of the jurisdiction when the current location of the user is not within a single party consent law state, (vi) determining whether the user is in public, (vii) automatically recording audio when the user is in public, (viii) automatically stopping the audio recording when the user is not in public, (ix) alerting the user of the stopped audio recording, and (ix) automatically resuming audio recording when the user is back in public. In some embodiments, the high-level defense recorder process further comprises (x) saving the audio recording at a limit point comprising one of a time limit and an individual audio recording file size limit, (xi) seamlessly and immediately starting a new audio recording, (xii) repeating the steps for saving and seamlessly starting new audio recordings in a loop, and (xiii) deleting older audio recordings based on age (oldest audio recording file deleted) when available storage space reaches a threshold limit or when the number of saved audio recordings exceeds a threshold number of audio recordings.

By way of example, FIG. 1 conceptually illustrates a high-level defense recorder process 100. The high-level defense recorder process 100 is performed by the defense recorder mobile app running on a mobile device of a user.

As shown in this figure, the high-level defense recorder process 100 begins when the user starts recording (at 110). For example, the user may launch and interact with the defense recorder mobile app to start recording audio at any time (e.g., in the morning before going out). When audio recording has been started, the high-level defense recorder process 100 of some embodiments automatically determines the current location of the user's mobile device via GPS, WiFi, cellular, or another communications-enabled location detection method. Then the high-level defense recorder process 100 loads the local recording laws based on current location of the mobile device. Next, the high-level defense recorder process 100 determines (at 120) what type of local recording laws correspond to the current location of the mobile device. Specifically, the high-level defense recorder process 100 determines whether the recording law at the current location is a single party consent recording law or not. When the current location is associated with single party consent recording laws, the high-level defense recorder process 100 proceeds forward with recording audio (at 130), regardless of the user's presence in public or in private.

On the other hand, when the current location does not have a single party consent rule, the high-level defense recorder process 100 of some embodiments moves forward to utilize the current location to reflect the laws (at 140) in realtime as the user and mobile device move from one location to another. While the user and mobile device may move into a different jurisdiction (e.g., from one state to a different state), that is a relatively rare occurrence. Instead, the high-level defense recorder process 100 is focused on reflecting the local recording laws (i.e., not being single party consent recording laws) based on whether the user is in public or not.

Accordingly, the high-level defense recorder process 100 determines (at 150) whether the user is currently in public or not. As noted above, recording in audio is typically not a problem. Thus, when the user is affirmatively determined to be public at the present moment, the high-level defense recorder process 100 continues to record audio (at 130). However, when the user is presently not in public (e.g., entered a private establishment, a home, or another private location), then the high-level defense recorder process 100 proceeds to a different step at which it stops recording and alerts the user (at 160) of the audio recording being stopped. In some embodiments, the defense recorder mobile app is configured to alert the user via haptic feedback, such as vibrating the user's mobile device by way of an onboard/embedded piezoelectric actuator of the mobile device. That way, the user is discretely alerted about the audio recording being stopped and can take actions to get into a public area if audio recording is needed. For example, if the user is assaulted in a private location, the user can try to get into public before engaging in a physical defense. Since the location of the user and mobile device is within a jurisdiction that requires more than single party consent to record audio, the defense recorder mobile app would wait until the user is back in public to restart recording the audio. Furthermore, the defense recorder mobile app would automatically restart the audio recording once the user's location has moved to a public location, which itself is determined in realtime. In this way, the high-level defense recorder process 100 provides the user with an effective way to gather corroborating audio evidence of their innocence in the event that an altercation leads to a legal suit, or just to prove innocence to others, restore reputation, etc.

Also, the high-level defense recorder process 100 demonstrates how the defense recorder system—via the defense recorder mobile app—is able to operate as an isolated mobile device defense recorder system, without need for a network connection to, for example, a cloud-based backend, cloud server, or cloud databases.

Specifically, the defense recorder system of some embodiments comprises an isolated mobile device defense recorder system. In some embodiments, the isolated mobile device defense recorder system comprises the defense recorder mobile app (which is installed and runs on a mobile device of a user), a jurisdictional recording laws database, an audio recordings database, a local storage of the mobile device, and a communications module of the mobile device. In some embodiments, the defense recorder system provides touch sensation notifications to the user via a haptics module. In some embodiments, the touch sensation notifications comprise vibrations generated by a piezoelectric actuator of the haptics module and/or embedded within the mobile device.

In some embodiments, the communications module comprises a cellular communications transceiver, a WiFi module, and a global positioning system ("GPS") module. In some embodiments, the location of the mobile device is determined based on location data received by the communications module. In some embodiments, the jurisdictional recording laws database and the audio recordings database are stored in a local storage of the mobile device which is accessible to the defense recorder mobile app when running on the mobile device.

An example of an isolated mobile device defense recorder system is described next, by reference to FIG. 2. Specifically, By way of example, FIG. 2 conceptually illustrates a block diagram of a mobile electronic device 200 (such as a smartphone) on which the defense recorder mobile app operates as either an isolated mobile device defense recorder system, without need for a network connection, or as a cloud-based defense recorder system which is configured to connect over a network (e.g., the internet) to a cloud application service and associated defense recorder cloud platform. In some embodiments, the defense recorder mobile app is configured to operate interchangeably in isolated mode as the isolated mobile device defense recorder system, when no network connection is available to the mobile device, and in network connection mode as the cloud-based defense recorder system, when a network connection is accessible to and successfully made by the mobile device and provides access to the cloud application service over the internet.

As shown in FIG. 2, the defense recorder system comprises a plurality of hardware devices, modules, programs or applications (software), and interfaces of the electronic mobile device. Specifically, acting as an isolated or cloud-connected defense recorder system, the mobile electronic device 200 can be any of several generally accepted computing and communication devices including, without limitation, a mobile cellphone device, a mobile smartphone device, a tablet computing device, a smart watch wearable computing device, etc. As shown in this figure, the mobile electronic device 200 comprises a bus 210, a random access memory (RAM) 220, a main control unit (MCU) 230 for runtime processing of the defense recorder mobile app and the audio recording laws, a code execution unit 240 embedded within the MCU 230, a first persistent flash memory 250 that stores the defense recorder mobile app along with the audio recording laws, a second persistent flash memory 260 that stores captured audio recordings, radio (RF) hardware 270 to transmit and receive wireless radio signals via WiFi, Bluetooth (BLE), Zigbee, Z-wave, cellular, or any other wireless data protocol, an audio microphone 280 for audio pickup, a haptics module 285 that is configured to generate and provide haptic feedback, such as vibrations through an embedded piezoelectric actuator (or other vibration generation unit), a touchscreen display 290 for visual output of a graphical user interface (GUI) of the defense recorder mobile app, and a GPS module 295 configured to receive geospatial location data from multiple GPS satellites (three or more) and calculate a current location of the mobile device. In some embodiments, the GPS module 295 is combined with the RF hardware 270 as an overall communications module, which also incorporates wireless communications modules for WiFi communication, cellular communication, and others, as noted above.

At runtime (or when 'launched'), the defense recorder mobile app is loaded into RAM 220 and executes via the code execution unit 240 of the MCU 230 to operate in isolated mode (such as when a network connection is not available) or to operate in network connection mode with data communication established with a back-end cloud server which hosts the defense recorder cloud application service. During execution, the defense recorder mobile app receives a command to start recording, calculates a current location via the GPS module 295, and loads local recording laws applicable for the current location. When the local recording laws specify single party consent, the defense recorder mobile app proceeds to capture audio, whether in public or in private. The audio is captured as an ongoing audio recording stored in the second persistent flash memory 260. The defense recorder mobile app seamlessly starts recording a new audio clip whenever the ongoing audio recording reaches a recording limit. In addition to seamlessly starting the new recording, the defense recorder mobile app checks whether to delete the oldest audio recording from the second persistent flash memory 260 (such as when a maximum is reached).

On the other hand, when the local recording laws are not associated with single party consent, then the defense recorder mobile app continuously checks the user and mobile device's location by way of the GPS module 295 and one or more communications devices when GPS is inoperable, such as when in a private parking garage, building, or other edifice (hereinafter referred to as "building"), such as WiFi, cellular, etc., If no other communications device can detect location when the user/mobile device enter a building, the defense recorder mobile app is configured to check one or more digital maps and identify the type of building, and whether the building is privately owned or a public building.

In some embodiments, the captured audio recordings are stored in the second persistent flash memory 260 until a maximum is reached. In some embodiments, the maximum is a maximum space for storing data on the second persistent flash memory 260. In some embodiments, the maximum is a number of audio recordings. When the maximum is reached, the defense recorder mobile app/defense recorder system automatically deletes one or more of the stored audio recordings, starting with the oldest audio recording. In some embodiments, the defense recorder mobile app/defense recorder system notifies the user before deleting the oldest audio recording. In this way, the user may backup the oldest audio recording to a different storage medium or location before the oldest audio recording is deleted from the second persistent flash memory 260. In some embodiments, the defense recorder mobile app is configured to utilize a cloud upload feature, provided through the defense recorder system, whereby the captured audio recordings are stored in the second persistent flash memory 260 until a network connection is established by the mobile electronic device 200. Through the cloud upload feature, the defense recorder mobile app in connection with the defense recorder system automatically uploads one or more of the captured audio recordings to a cloud storage. In some embodiments, the cloud storage comprises a personal cloud storage specified by the user. In some embodiments, the cloud storage comprises a cloud storage associated with the defense recorder cloud application service. A user-specific audio recordings database 360, described below by reference to FIG. 3, provides an example of a cloud storage associated with a defense recorder cloud application service to which the defense recorder mobile app may upload the audio recordings.

In some embodiments, the defense recorder mobile app enables a user to constantly record ambient audio, in a looping manner in which the defense recorder mobile app prepares to start recording a new audio clip while actively recording a current audio clip and, when a predetermined recording time has been reached, the defense recorder mobile app automatically saves the current audio recording to the audio recordings database while seamlessly starting the new audio recording. In some embodiments, the defense recorder mobile app is further configured to save a predetermined number of audio recording clips and, when the predetermined number of audio recording clips is reached, automatically delete the oldest audio clip to make room to save the most recent audio recording. The saved audio recording clips can be accessed by the user at a later time, such as when needed to demonstrate the justified or excused actions (or non-action in the face of an aggressor) of the defender, thereby providing evidence for a rational legal defense or non-legal character defense with respect to a conflict or other controversial event. In short, the defense recorder mobile app successfully provides an audio "alibi" that involves no actions on the part of the defender/user to start a recording during the conflict or controversial event, since the user can simply start recording in the morning (or some other time before encountering the event). At a baseline, the defense recorder mobile app has no significant drawback for the user because it is configured to automatically delete old recordings, meaning that the user's device will not run out of storage space. In this way, if the user does not encounter a conflict on a given day, there is no loss of anything significant. On the other hand, if a conflict is encountered by the user, the defense recorder mobile app will automatically perform recording of audio, save audio clips, and manage audio clip storage, so that the user can access the relevant clips later, after the conflict ends.

In some embodiments, the defense recorder system allows a user to set and configure other options that expand the basic functionality of the defense recorder mobile app and which may help an investigation when, for example, the user is a victim of a crime or other egregious actions by a perpetrator to their self, character, reputation, etc. In particular, the defense recorder system of some embodiments allows the user to set a personal cloud storage location and configure the defense recorder mobile app to upload the oldest audio recordings to the personal cloud storage before deletion from the audio recordings database on the mobile device. Also, the defense recorder system of some embodiments allows the user to designate a contact and configure the defense recorder mobile app to automatically share each audio recording with the designated contact. In some embodiments, the defense recorder mobile app manages a designated contact sharing list which includes a digital contact address, such as an email address, phone number at which to receive a text message (SMS), a private identifier associated with another messaging application at which to receive messages, a cloud storage location associated with the designated contact, etc. In this way, the defense recorder system may automatically record audio in realtime and store the audio recordings in the local storage of the mobile device (so that that user may access the audio recordings later) and contemporaneously (or shortly after) provide each audio recording to the designated contact through the digital contact address. In addition to cloud upload and designated contact sharing features, the defense recorder system of some embodiments provides an afterlife feature through which the user may select the designated contact or a different contact to receive all audio recordings saved in the audio recordings database as stored in the local storage of the mobile device and any audio recordings uploaded to the user's personal cloud storage location. The afterlife feature is triggered by the defense recorder system if and when death of the user is determined.

In addition to automatically recording audio and managing stored audio clips, the defense recorder mobile app is configured to collect a number of data parameters along with each audio recording, storing the data parameters as metadata associated with the audio recordings stored in the audio recordings database. In particular, the defense recorder mobile app is configured to capture location data from the communications module (i.e., GPS data from the GPS module, triangulated location data from the cellular communications transceiver, and interior building location from the WiFi module) in order to determine the user's exact location, and automatically comply with the local audio recording laws of the location. In addition to the location data parameters, the defense recorder mobile app is configured to capture other applicable data such as, without limitation body metrics data (e.g., heart rate, speed of movement based on time to move from one location to another location, etc.), connected device data that lists connected and detected devices nearby the user's mobile device, time and location history traversal data, etc.

Furthermore, to comply with local recording laws, the defense recorder mobile app is configured to access the jurisdictional recording laws database to retrieve the audio recording laws for the location of the user. In some embodiments, the jurisdictional recording laws database is capable of storing audio recording laws for all jurisdictions, states, regions, etc. When the current location is known or determined via the communications module, the defense recorder mobile app is easily able to retrieve the recording laws from the database. On the other hand, the user may start with only local audio recording laws being stored in the jurisdictional recording laws database. For instance, when downloading and installing the defense recorder mobile app, the user may allow the defense recorder mobile app to access data from the communications module to determine a present location of the mobile device. Based on the present location, the defense recorder mobile app may download and store only the local audio recording laws, instead of all the audio recording laws worldwide or over a larger geographic area. Then, if the user should travel to another region or location outside of the area in which the local audio recording laws apply, the defense recorder mobile app may automatically connect to a cloud application service (automatically switching into the network connected mode) and retrieve audio recording laws for this other area. In this way, defense recorder mobile app determines local recording laws based on location (state, region, province, jurisdiction, etc.) and then matches the user's current location with the relevant audio recording laws at that current location. Also, the user may configure the defense recorder mobile app to define an area, which may be a single state or province, an entire country, or worldwide. The defined area, as configured, would allow the applicable audio recording laws to be downloaded and saved in the jurisdictional recording laws database and made accessible to the defense recorder mobile app. Additionally, the defense recorder mobile app may be configured to automatically update the audio recording laws stored in the jurisdictional recording laws database. For example, the local recording laws for a given location may change from a single party consent law to an audio recording law in which all parties being recorded must consent.

In some embodiments, the defense recorder system comprises a cloud-based defense recorder system comprising a defense recorder cloud server, an audio recordings cloud database, and a jurisdictional recording laws cloud database. In some embodiments, the cloud-based defense recorder system hosts a cloud application service that provides access to the cloud-based jurisdictional recording laws database and the audio recordings cloud database. In some embodiments, the audio recordings cloud database is configured to securely store audio clips captured by devices of users of the defense recorder system. In some embodiments, the audio clips are encrypted for secure storage in the audio recordings cloud database and further secured by user permissions which limit access only to corresponding users who recorded the audio clips prior to storage in the audio recordings cloud database. In some embodiments, the cloud-based defense recorder system further comprises a front-end web server that provides (i) a web gateway to which browser programs on conventional computing devices connect to access the cloud application service and (ii) a mobile gateway to which the defense recorder mobile app connects, when running on a mobile device, to access the cloud application service. In some embodiments, the cloud-based defense recorder system further comprises a registered user database that is communicably connected to the front-end web server and provides user authentication services in connection with the web gateway and the mobile gateway. In some embodiments, the cloud-based defense recorder system further comprises a firewall and an administrator computing device configured to enable an administrator to make changes to the defense recorder cloud server, the audio recordings cloud database, and the jurisdictional recording laws cloud database as needed.

In some embodiments, the cloud-based defense recorder system supports the cloud upload feature in a way that configures the defense recorder mobile app to detect whether the mobile device of the user is connected to the cloud application service and, when not connected or even connected to the internet, to store the audio recordings locally in the audio recordings database on the local storage of the mobile device until the mobile device is connected to the internet. Once connected to the internet and the cloud application service, the defense recorder mobile app automatically uploads the locally stored audio recordings to at least the audio recordings cloud database and, if so configured by the user, to another cloud storage (such as the user's personal cloud storage, a cloud storage location of a designated contact, etc.). In some embodiments, the user may set other cloud storage locations (e.g., personal cloud storage, designated contact cloud storage, etc.) in an online cloud storage profile associated with the user. After uploading the audio recordings to the audio recordings cloud database of the cloud-based defense recorder system (and, optionally, any personal or designated contact cloud storage as configured in the settings of the user's online cloud storage profile), the defense recorder mobile app automatically deletes the locally stored audio recordings from the audio recordings database on the local storage of the mobile device. In this way, the defense recorder system is able to switch between operation as the isolated mobile device defense recorder system and operation as the cloud-based defense recorder system, depending on the availability of a network connection to the internet and the cloud application service hosted by the cloud-based defense recorder system.

In addition, the defense recorder system of some embodiments (whether operating as the isolated mobile device defense recorder system or the cloud-based defense recorder system) supports a multi-mic mode that enables a user to configure the defense recorder mobile app to receive audio captured simultaneously from multiple microphones. In some embodiments, the multi-mic mode triggers the defense recorder system to identify, continuously and in realtime, which microphone is capturing the highest quality audio. In some embodiments, the multi-mic mode also triggers the defense recorder system to apply the incoming audio from the identified microphone to the audio recording and switch, in realtime, to a different microphone when the defense recorder system detects that the audio quality captured by the different microphone is presently the highest quality audio among the multiple microphones. In some embodiments, a single audio recording from multiple microphones is supported by an audio mesh system that is configured to seamlessly mesh together audio streams from different microphones by connecting and aligning (in a timeline) separate incoming audio streams in a composite meshed audio recording. In some embodiments, the audio mesh system of the defense recorder system also normalizes sound of the separate incoming audio streams to a single, consistent sound level for the composite meshed audio recording.

By way of example, FIG. 3 conceptually illustrates a network architecture of a defense recorder system 300 configured to provide access to a defense recorder cloud application service. As shown in this figure, the defense recorder system 300 includes a plurality of mobile devices 305-315, a non-mobile computing device 320, a wireless communication point 325 (e.g., a cell tower for cellular data communication), a gateway 330, a front-end web and mobile gateway server 340, GPS satellites 335 (while only one satellite is shown in this figure, the satellite is intended to represent three or more GPS satellites), a registered user database 345, a firewall 350, a defense recorder cloud server 355, a user-specific audio recordings cloud database 360, a jurisdictional recording laws cloud database 365, and an administrator workstation computer 370.

The plurality of mobile devices 305-315 shown in this figure include a mobile smartphone device 305, a tablet computing device 310, and a smart watch device 315. The non-mobile computing device 320 may be a personal computer, a laptop, etc., which may include browser software or other software to access the defense recorder cloud application service. Each of the plurality of mobile devices 305-315 (and, optionally, the non-mobile computing device 320) are enabled for wireless communication by way of WiFi, Bluetooth, cellular, or other RF wireless signal technology. While the tablet computing device 310 and the smart watch device 315 are shown connecting wirelessly to the cloud to access the defense recorder cloud application service, the smartphone device 305 demonstrates an alternate connection method via the wireless communication point 325 and gateway 330. Also, each of the plurality of mobile devices 305-315 shown in this figure include their own embedded/onboard GPS module, each of which is configured to receive geospatial location data from the GPS satellites 335 to calculate current geographical location of the respective device 305-315.

By contrast to the mobile devices 305-315, the non-mobile computing device 320 may include a WiFi module to wirelessly connect to a network (internet, labeled 'cloud' in this figure) and may also include a network adapter for wired connection to the network (e.g., an Ethernet card with WiFi chip). Also, the non-mobile computing device 320 typically would not include a GPS module and does not receive geospatial location data from the GPS satellites 335.

Whatever manner of connection, the defense recorder system 300 provides the front-end web and mobile gateway server 340 as a user entry point, whether accessing the backend via mobile app or browser. Once connection is established, the users of the respective connecting devices are authenticated (e.g., via username/password, two-factor authentication, or other scheme). For authentication purposes, the registered user database 345 may be accessed by the front-end web and mobile gateway server 340. More specifically, the plurality of mobile devices 305-315, which all have the defense recorder mobile app installed, are authenticated by a mobile gateway of the front-end web and mobile gateway server 340. In contrast, the non-mobile computing device 320, via browser software, is authenticated by a web gateway of the front-end web and mobile gateway server 340. No access beyond the firewall 350 is permitted unless the user (of the respective device 305-320) is properly and validly authenticated. However, when authentication of the user is successful, then a data communication session is started in connection with the defense recorder cloud application service, which is hosted on the defense recorder cloud server 355. Through this data communication session, the defense recorder mobile app running on the user's mobile device (e.g., devices 305-315) can access the jurisdictional recording laws cloud database 365 to download local recording laws or update local recording laws stored on their respective device. Also through this data communication session, the defense recorder mobile app automatically uploads audio recordings from the user's mobile device to the defense recorder cloud application service for storage by the defense recorder cloud server 355 in the user-specific audio recordings cloud database 360.

On the other hand, a user operating the non-mobile computing device 320 can, upon successful authentication and browser session connection with the defense recorder cloud application service, manage their audio recordings stored in the user-specific audio recordings cloud database 360 as needed. For example, the user of the non-mobile computing device 320 may wish to download some audio recordings that were captured and uploaded (streamed) to the defense recorder cloud application service (and stored in the user-specific audio recordings cloud database 360) from a mobile device that was later destroyed by a perpetrator who put the user in the position of defending his or her reputation or protecting him or herself from physical harm.

In some embodiments, the administrator workstation computer 370 provides an administrator user with direct access to the defense recorder cloud server 355 to administer software updates and/or make configuration or settings changes to the defense recorder cloud application service. Furthermore, the administrator user may perform database administrative activities such as updating software, backing up data, installing updated local recording laws that may periodically change, replacing hardware storage devices and restoring backup copies of the databases on the replaced, upgraded hardware storage devices, etc.

Several aspects and features of the defense recorder system 300, described above, are fleshed out in a detailed defense recorder process. In some embodiments, the detailed defense recorder process comprises (i) determining whether the user has engaged audio recording, (ii) identifying a present location of the user including a state in which the user is located currently and retrieving the recording consent laws for the state, (iii) recording audio until a stop recording command is triggered by the user selecting to stop audio recording or upon the user entering a private property location when the identified location of the user is in a state that does not observe single-party recording consent, (iv) alerting the user that recording has automatically paused (stopped momentarily) due to user's location upon entering the private property and will remain paused until the user leaves the private property, (v) alerting the user that audio recording has resumed when the user exits the private property, (vi) continuing to record the audio for a certain amount of time as directed by the user, (vii) ending the recording after the certain amount of time lapses, (viii) saving the audio recording and simultaneously starting a new audio recording automatically by the defense recorder mobile app, (ix) determining whether a number of saved audio recordings exceeds a threshold number of audio recordings configured to store in total (as directed by the user), and (x) deleting the oldest audio recording to make space for the newest audio recording when the number of saved audio recordings exceeds the threshold number of audio recordings. An example of a detailed defense recorder process is described next, by reference to FIG. 4.

Specifically, FIG. 4 conceptually illustrates a detailed defense recorder process 400. The detailed defense recorder process 400 is performed by the defense recorder mobile app running on a mobile device operated by a user. As shown in this figure, the detailed defense recorder process 400 beings upon the user starting audio recording, which is initiated through the defense recorder mobile app.

In some embodiments, the detailed defense recorder process 400 calculates a current location of the mobile device (at 405) based on geospatial location data received from the GPS satellites. After the current location of the mobile device is calculated, the detailed defense recorder process 400 identifies a jurisdiction in which the mobile device (and user) are currently positioned (at 410). For instance, the jurisdiction may be a state in which particular state-wide recording laws are consistently applied throughout the state, but which may differ from the recording laws of different adjacent or nearby jurisdictions.

In some embodiments, the detailed defense recorder process 400 then determines (at 415) whether single party consent laws are applicable to the identified jurisdiction or not. When the local recording laws for the jurisdiction indicate that single party consent laws apply to the jurisdiction ('YES'), the detailed defense recorder process 400 just continues to record audio (at 420) via the mobile device until the user stops recording or a timed duration expires. For instance, the user gets home and interacts with the user interface of the defense recorder mobile app running on the user's mobile device and, through the user interface, the user selects a 'STOP RECORDING' option or GUI button, or similar such interface tool or menu option. A timed duration may expire, for example, if and when the user sets a timed duration in the configuration settings of the defense recorder mobile app. However, the default behavior of the defense recorder mobile app is to record continuously and without stopping. So, the timed duration requires some prior action to configure the defense recorder mobile app in advance of active audio recording.

Turning back to the determination (at 415), when the local recording laws for the jurisdiction DO NOT indicate that single party consent laws apply to the jurisdiction ('NO'), the detailed defense recorder process 400 also continues to record audio, but only unit the user enters a private property location (at 425). To identify when the user enters a private location, the detailed defense recorder process 400 continuously determines in realtime whether the user is still in public (at 430). In some embodiments, the detailed defense recorder process 400 checks the user's location continuously (via re-calculating the current location based on GPS data) and compares to maps of known public and known private locations. Thus, when the user is determined to be in public, the detailed defense recorder process 400 goes back to recalculate the user's now updated/current location and checking again (via transition back to the determination step (at 430)). However, when the user is determined (at 430) to be currently at a private location (not in public), then the detailed defense recorder process 400 automatically pauses audio recording (at 435) and also notifies the user that recording has paused/stopped because of entering the private location (at 440). In some embodiments, the defense recorder mobile app automatically triggers the mobile device to vibrate as a type of no-action-required for the user to receive an indication of the notification that recording has been paused. In this way, the user can retreat from the private location as needed or take other protective actions.

After pausing the recording of audio (at 435) and notifying the user (at 440) of the paused recording, the detailed defense recorder process 400 of some embodiments moves forward to make a realtime determination of whether the user/mobile device is still within the private location or not (at 445). When the user and mobile device are still present at the private location (and so long as the user/mobile device remain at the private location), the detailed defense recorder process 400 continuously transitions back to the determination of whether the user is at the private property location or not (at 445), while continuously recalculating the user's updated location (via GPS, WiFi, cellular, or another manner of determining location).

On the other hand, when the user's current location is determined (at 445) to no longer be in the private location, then the detailed defense recorder process 400 automatically resumes the recording of audio (at 450) since the user and mobile device are now in public.

Next, the detailed defense recorder process 400 of some embodiments determines whether to stop recording or not (at 455). For example, an audio recording file size limit may be reached and the defense recorder mobile app takes action to stop the recording, save the recording, and seamlessly start a new recording. Or as another example, the user may initiate a shutdown option, close the defense recorder mobile app, select a GUI button or other option to stop recording, hit a timed duration, etc. In another example, the mobile device itself may reach an operational limit, such as having a low battery (e.g., down to 5% remaining power or some other low amount of remaining power, so automatic stopping and storage of recording is initiated). This is possible even though the default operation is to record constantly and continuously so long as the mobile device is powered and operating and the defense recorder mobile app is running.

When the audio recording by the defense recorder mobile app is not triggered to stop recording, the detailed defense recorder process 400 transitions back to the step of continuing to record the audio until the user enters a private location (at 425), and following through the subsequent steps in the manner described above.

On the other hand, when the audio recording is triggered to stop (by file size limitation, user action, or mobile device operating limitation), the detailed defense recorder process 400 stops the recording and automatically saves the audio recording and performs any necessary management of the audio recordings (at 460) stored in local storage on the user's mobile device, uploading of audio recordings to the cloud database, and/or deleting of the oldest audio recording, etc. Then the detailed defense recorder process 400 determines (at 465) whether to start a new audio recording or not.

When the recording was stopped due to a file size limitation imposed on audio recordings, the detailed defense recorder process 400 automatically, immediately, and seamlessly starts a new recording ('YES') and the detailed defense recorder process 400 transitions back to the step of calculating the current location (at 405), with all subsequent steps following in the manner described above.

Similarly, if the user had stopped the recording manually or the device triggered the recording to stop due to a low power limitation, a new recording may be initiated by the user (e.g., by selection of a GUI button to start again or a menu option for the same) or may be triggered automatically by the defense recorder mobile app if and when the user connects the mobile device to a wired power source, such as a backup battery or a wall outlet power source. While there may be a delay between the time the audio recording stopped and when a new recording started, the detailed defense recorder process 400 still transitions back to the step of calculating the current location (at 405), with all subsequent steps following in the manner described above.

On the other hand, when no new recording is determined (at 465) to be started, then the detailed defense recorder process 400 ends.

By way of another example, FIG. 5 conceptually illustrates an electronic system 500 with which some embodiments of the invention are implemented. The electronic system 500 may be a full-blown bare metal computer system, such as a personal computer (e.g., non-mobile computing device 320 or the administrator workstation computer 370), a laptop computer, a single board computer (SBC), a server computing device (e.g., the defense recorder cloud server 355 or the front-end web and mobile gateway server 340), or any other sort of electronic device. Such an electronic system includes various types of computer readable media and interfaces for various other types of computer readable media. The electronic system 500 shown in this figure includes a bus 505, processing unit(s) 510, a system memory 515, a read-only memory 520, a permanent storage device 525, input devices 530, output devices 535, and a network 540.

The bus 505 collectively represents all system, peripheral, and chipset buses that communicatively connect the numerous internal devices of the electronic system 500. For instance, the bus 505 communicatively connects the processing unit(s) 510 with the read-only memory 520, the system memory 515, and the permanent storage device 525. From these various memory units, the processing unit(s) 510 retrieves instructions to execute and data to process in order to execute the processes of the invention. For example, instructions to automatically receive audio recording streams from different user devices and to store those different audio recordings from different users in a secure and encrypted manner with user permissions that secure data stored in the audio recordings cloud database. Another example would involve automated push notifications of updated or new local recording laws to users of the defense recorder mobile app. Furthermore, the processing unit(s) may be a single processor or a multi-core processor in different embodiments.

The read-only-memory (ROM) 520 stores static data and instructions that are needed by the processing unit(s) 510 and other modules of the electronic system. The permanent storage device 525, on the other hand, is a read-and-write memory device. This device is a non-volatile memory unit that stores instructions and data even when the electronic system 500 is off. Some embodiments of the invention use a mass-storage device (such as a magnetic or optical disk and its corresponding disk drive) as the permanent storage device 525.

Other embodiments use a removable storage device (such as a floppy disk, a memory card, or a flash drive) as the permanent storage device 525. Like the permanent storage device 525, the system memory 515 is a read-and-write memory device. However, unlike storage device 525, the system memory 515 is a volatile read-and-write memory, such as a random access memory. The system memory 515 stores some of the instructions and data that the processor needs at runtime. In some embodiments, one or more aspects of server-side operations associated with the defense recorder processes, described above by reference to FIGS. 1 and 4, are stored in the system memory 515 even when preceding operations may be performed via the defense recorder mobile app on a given user's mobile device, or in the permanent storage device 525, and/or the read-only memory 520. For example, the various memory units may store instructions for receiving different streams of audio data for different audio recordings captured by different mobile devices of users as well as instructions for encrypting and persistently storing the different audio recordings in the audio recordings cloud database and/or instructions to push recording law updates to the defense recorder mobile apps installed on user mobile devices. From these various memory units, the processing unit(s) 510 retrieves instructions to execute and data to process at runtime in order to execute the processes of some embodiments.

The bus 505 also connects to the input and output devices 530 and 535. The input devices enable a user, such as an administrator user, to communicate commands, specify particular instructions, and/or select commands to provide to the electronic system 500. The input devices 530 include alphanumeric keyboards, pointing devices (also called "cursor control devices"), etc. The output devices 535 display images, graphics, and textual data generated by the electronic system 500. The output devices 535 include display devices, such as liquid crystal displays (LCD), organic light emitting diode (OLED) displays, or even cathode ray tube (CRT) display devices or other display technology devices. Display devices may be integrated into the underlying electronic system (such as the defense recorder cloud server or the administrator workstation computer) or may be connected by cable (e.g., Ethernet cable). Some embodiments include devices such as a touchscreen that functions as both input and output devices.

Finally, as shown in FIG. 5, bus 505 also couples electronic system 500 to a network 540 through a network adapter (not shown). In this manner, the computer can be a part of a network of computers (such as a local area network ("LAN"), a wide area network ("WAN"), or an intranet), or a network of networks (such as the Internet or "cloud"). Any or all components of electronic system 500 may be used in conjunction with the invention.

The functions described above can be implemented in digital electronic circuitry, in computer software, firmware, or hardware, and embedded within any digital reusable shipper unit. The techniques can be implemented using one or more computer program products. Programmable processors and computers can be packaged or included in mobile devices. The processes may be performed by one or more programmable processors and by one or more set of programmable logic circuitry. General and special purpose computing and storage devices can be interconnected through communication networks.

The above-described embodiments of the invention are presented for purposes of illustration and not of limitation. While these embodiments of the invention have been described with reference to numerous specific details, one of ordinary skill in the art will recognize that the invention can be embodied in other specific forms without departing from the spirit of the invention. For instance, the defense recorder system can be adapted to provide an emergency alert system. Similarly, the defense recorder system can be utilized to help medical patients with memory loss, security guards with law enforcement, business professionals with enforcing verbal agreements, and otherwise help to legally defend the rights of law abiding citizens, while aiding users in obtaining evidence in a legally sound manner to defend against injustice when those users are victims of crime themselves. Thus, one of ordinary skill in the art would understand that the invention is not to be limited by the foregoing illustrative details, but rather is to be defined by the appended claims.

What is claimed is:

1. A defense recorder mobile application-implemented process comprising:
    identifying, by a mobile device operable by a user, a present location of the user;
    determining, by a defense recorder mobile app running on the mobile device, whether the present location of the user is within one of (i) a single party consent law state and (ii) a non-single party consent law state that does not observe single-party recording consent;
    automatically recording audio by a microphone of the mobile device when the present location of the user is within the single party consent law state;
    determining, by the defense recorder app when the present location of the user is within the non-single party consent law state, whether the user has engaged audio recording by a user interaction with the mobile device;
    identifying, when the present location of the user is within the non-single party consent law state and the user has engaged audio recording, an updated location of the user;
    determining, when the updated location of the user is within the non-single party consent law state and the user has engaged audio recording, a current location of the user based on the updated location, wherein the current location of the user comprises one of a private property location and a public location;
    recording audio, by the mobile device when the user has engaged audio recording and the current location is the public location, until a particular stop event is identified by the defense recorder app to cease audio recording, wherein the particular stop event comprises one of (i) a stop recording command triggered by the user to stop audio recording and (ii) an automatic stop recording command that automatically pauses audio recording upon the user entering the private property location when the updated location of the user is within the non-single party consent law state;
    alerting the user, through the defense recorder app when the particular stop even is the automatic stop recording command, that audio recording is paused due to the user entering the private property location and that audio recording will remain paused until the user leaves the private property location and enters the public location;
    resuming audio recording, by the mobile device, only when the user exits the private property location and enters the public location;
    alerting the user, contemporaneously with resuming audio recording, that audio recording has resumed when the user exits the private property location and enters the public location;
    identifying a time of recording parameter configured by the user in the defense recorder app;
    continuing to record audio, by the mobile device, for a certain amount of time based on the identified time of recording parameter;
    ending the audio recording after the certain amount of time lapses;
    saving the audio recording in a local storage of the mobile device and simultaneously starting a new audio recording automatically by the defense recorder mobile app;
    identifying a maximum number of saved audio recordings parameter configured by the user in the defense recorder app;
    determining whether a current number of saved audio recordings, stored in the local storage, exceeds the identified maximum number of saved audio recordings parameter in the defense recorder app; and
    deleting an oldest audio recording from the saved audio recordings stored in the local storage of the mobile device, wherein deleting the oldest audio recording frees up storage space in the local storage for saving the new audio recording when the current number of saved audio recordings exceeds the identified maximum number of saved audio recordings parameter in the defense recorder app.

2. The defense recorder mobile application-implemented process of claim 1 further comprising automatically collecting metadata associated with the audio recording.

3. The defense recorder mobile application-implemented process of claim 2, wherein the metadata comprises location data.

4. The defense recorder mobile application-implemented process of claim 2, wherein the metadata comprises time data.

5. The defense recorder mobile application-implemented process of claim 2, wherein the metadata comprises body measurement and vitals data.

6. The defense recorder mobile application-implemented process of claim 2, wherein the metadata comprises acceleration data.

7. The defense recorder mobile application-implemented process of claim 1, wherein the microphone is a first onboard microphone of the mobile device, wherein a second microphone is externally connected to the mobile device.

8. The defense recorder mobile application-implemented process of claim 7, wherein the defense recorder app is configured to utilize an audio mesh system the connects and aligns separate incoming audio streams captured by the first onboard microphone and the second microphone.

9. The defense recorder mobile application-implemented process of claim 8, wherein the audio mesh system is configured to normalize sound levels of the connected and aligned audio streams captured by the first onboard microphone and the second microphone.

10. The defense recorder mobile application-implemented process of claim 8, wherein the second microphone is externally hard wire connected to the mobile device.

11. The defense recorder mobile application-implemented process of claim 8, wherein the second microphone is wirelessly connected to the mobile device.

\* \* \* \* \*